United States Patent
Iyer et al.

(10) Patent No.: US 8,966,430 B1
(45) Date of Patent: Feb. 24, 2015

(54) ROBUST NUMERICAL OPTIMIZATION FOR OPTIMIZING DELAY, AREA, AND LEAKAGE POWER

(71) Applicant: Synopsys, Inc., Mountain View, CA (US)

(72) Inventors: Mahesh A. Iyer, Fremont, CA (US); Amir H. Mottaez, Los Altos, CA (US)

(73) Assignee: Synopsys, Inc., Mountain View, CA (US)

( * ) Notice: Subject to any disclaimer, the term of this patent is extended or adjusted under 35 U.S.C. 154(b) by 14 days.

(21) Appl. No.: 13/954,923

(22) Filed: Jul. 30, 2013

(51) Int. Cl.
G06F 17/50 (2006.01)

(52) U.S. Cl.
CPC ................ *G06F 17/5072* (2013.01)
USPC .......................................... 716/133

(58) Field of Classification Search
CPC ................ G06F 17/30; G06F 17/50
USPC .......................................... 716/133
See application file for complete search history.

(56) References Cited

U.S. PATENT DOCUMENTS

| | | | |
|---|---|---|---|
| 2010/0169846 A1* | 7/2010 | Gupta et al. | 716/2 |
| 2012/0221995 A1* | 8/2012 | Zahn et al. | 716/134 |
| 2013/0254734 A1* | 9/2013 | Gupta et al. | 716/133 |
| 2014/0040845 A1* | 2/2014 | Zahn et al. | 716/114 |

* cited by examiner

*Primary Examiner* — Jack Chiang
*Assistant Examiner* — Mohameed Alam
(74) *Attorney, Agent, or Firm* — Park, Vaughan, Fleming & Dowler LLP; Laxman Sahasrabuddhe

(57) ABSTRACT

Systems and techniques are described for performing numerical delay, area, and leakage power optimization on a circuit design. During operation, an embodiment can iteratively perform at least the following set of operations in a loop, wherein in each iteration a current threshold voltage value is progressively decreased: (a) perform numerical delay optimization on the circuit design using a numerical delay model that is generated using gates in a technology library whose threshold voltages are equal to the current threshold voltage; (b) perform a total negative slack based buffering optimization on the circuit design; and (c) perform a worst negative slack touchup optimization on the circuit design that uses gates whose threshold voltages are greater than or equal to the current threshold voltage. Next, the embodiment can perform combined area and leakage power optimization on the circuit design. The embodiment can then perform multiple iterations of worst negative slack touchup optimization.

15 Claims, 4 Drawing Sheets

ROBUST NUMERICAL OPTIMIZATION FOR OPTIMIZING DELAY, AREA, AND LEAKAGE POWER

TECHNICAL FIELD

This disclosure relates electronic design automation (EDA). More specifically, this disclosure relates to a robust numerical optimization for optimizing delay, area, and leakage power.

BACKGROUND

Related Art

The goal of circuit synthesis is to convert a high-level description of a circuit design into an implementation that meets a set of timing constraints, and at the same time meets area and leakage power requirements.

Some circuit synthesis approaches create an initial circuit design at a given abstraction level (e.g., a logical or physical design). Next, a cell is identified in the circuit design for optimization based on the metrics that are desired to be optimized. An optimal size for the identified cell is then determined by iteratively replacing the identified cell with functionally equivalent cells that have different sizes (this optimization process is also referred to as "sizing the cell," "sizing the gate," etc.). For each replacement cell size that is tried, the circuit synthesis approach updates timing information, and rejects cell sizes for which one or more timing constraints are violated. The iterative optimization process typically terminates after the optimization process has executed for a certain number of iterations or for a certain amount of time. One aspect that makes this process even more computationally expensive is that modern technology libraries have many sizes associated with each gate type with varying driving capability and/or multiple threshold voltages. A higher threshold voltage corresponds to a lower leakage power, but worse delay characteristics. Conversely, a lower threshold voltage corresponds to higher leakage power, but better delay characteristics. Therefore, circuit synthesis tools need to optimize the circuit design within the context of a difficult tradeoff between delay, area, and leakage power.

Unfortunately, such iterative trial-and-error based circuit synthesis approaches either take too long to complete and/or produce poor quality results for large circuit designs in which timing constraints are checked across many process corners and modes.

A circuit synthesis approach that is different from iterative trial-and-error approaches is described in Ivan Sutherland, Robert F. Sproull, and David Harris, *Logical Effort: Designing Fast CMOS Circuits*, Morgan Kaufmann, 1999 (hereinafter "Sutherland"). The cell delay can be represented using the following expression:

$$d = R \cdot C_o + p, \quad (1)$$

where, R is the output resistance of the cell, $C_o$ is the output loading, and p is the parasitic delay of the cell. Equation (1) can then be rewritten as:

$$d = (R \cdot C_i) \cdot \left(\frac{C_o}{C_i}\right) + p, \quad (2)$$

where, $C_i$ is the input capacitance presented by the cell at one of its input terminals.

The circuit synthesis approach described in Sutherland uses the following linear cell delay model:

$$d = g \cdot h + p, \quad (3)$$

where, g represents the logical effort, h represents the electrical effort, and p represents the parasitic delay of the cell. The logical effort captures the effect of the cell's topology on its ability to produce output current. The logical effort is independent of the size of the transistors in the circuit. The electrical effort describes how the electrical environment of the cell affects performance, and how the size of the transistors in the cell determines its load-driving capability. The parasitic delay is a form of delay overhead that accompanies any gate. The logical effort g and the parasitic delay p can be normalized, e.g., they can be normalized with respect to the logical effort and parasitic delay values, respectively, of a reference inverter.

Comparing Equations (2) and (3) we note that the first term $(R \cdot C_i)$ represents the logical effort g, and the second term $$\left(\frac{C_o}{C_i}\right)$$

represents the electrical effort h.

The delay model that is used by a circuit synthesis approach must be accurate, i.e., it must accurately model the actual cell delays. If the delay model is inaccurate, the circuit implementation produced by the circuit synthesis approach will likely contain many timing violations. In the above-mentioned work by Sutherland et al., the authors state that the linear delay model is approximate, i.e., it does not accurately model the actual cell delays. Additionally, Sutherland does not consider circuit optimization for leakage power, area, and delay. What are needed are fast and accurate circuit synthesis approaches that are capable of optimizing leakage power, area, and delay.

SUMMARY

Some embodiments described herein perform numerical delay, area, and leakage power optimization on a circuit design. During operation, some embodiments can iteratively perform at least the following set of operations in a loop, wherein in each iteration a current threshold voltage value is progressively decreased: (a) perform numerical delay optimization on the circuit design using a numerical delay model that is generated using gates in a technology library whose threshold voltages are equal to the current threshold voltage; (b) perform a total negative slack based buffering optimization on the circuit design (this operation can use the gates in the current threshold voltage for numerical filtering and also use gates whose threshold voltages are greater than or equal to the current threshold voltage for the buffer topology creation); and (c) perform a worst negative slack touchup optimization on the circuit design that uses gates whose threshold voltages are greater than or equal to the current threshold voltage.

Next, the embodiments can perform combined area and leakage power optimization on the circuit design. Specifically, the embodiments can compute the optimum gate size (i.e., optimum in the context of area recovery) for each threshold voltage group using numerical area recovery. Next, the optimum gate size for each threshold voltage group can be discretized, i.e., an actual gate can be selected from a technology library based on the optimum gate size. The embodiments can then compute a composite score for the discretized gate in each threshold voltage group, wherein the composite score is computed based on the area of the discretized gate and the leakage power of the discretized gate. The embodiments can then select the discretized gate from the threshold voltage group that provides the best score (i.e., the minimum score).

Finally, the embodiments can perform multiple iterations of fast WNS touchup optimization, wherein cells with progressively lower threshold voltages are included in each successive iteration.

DETAILED DESCRIPTION

Figure 1:
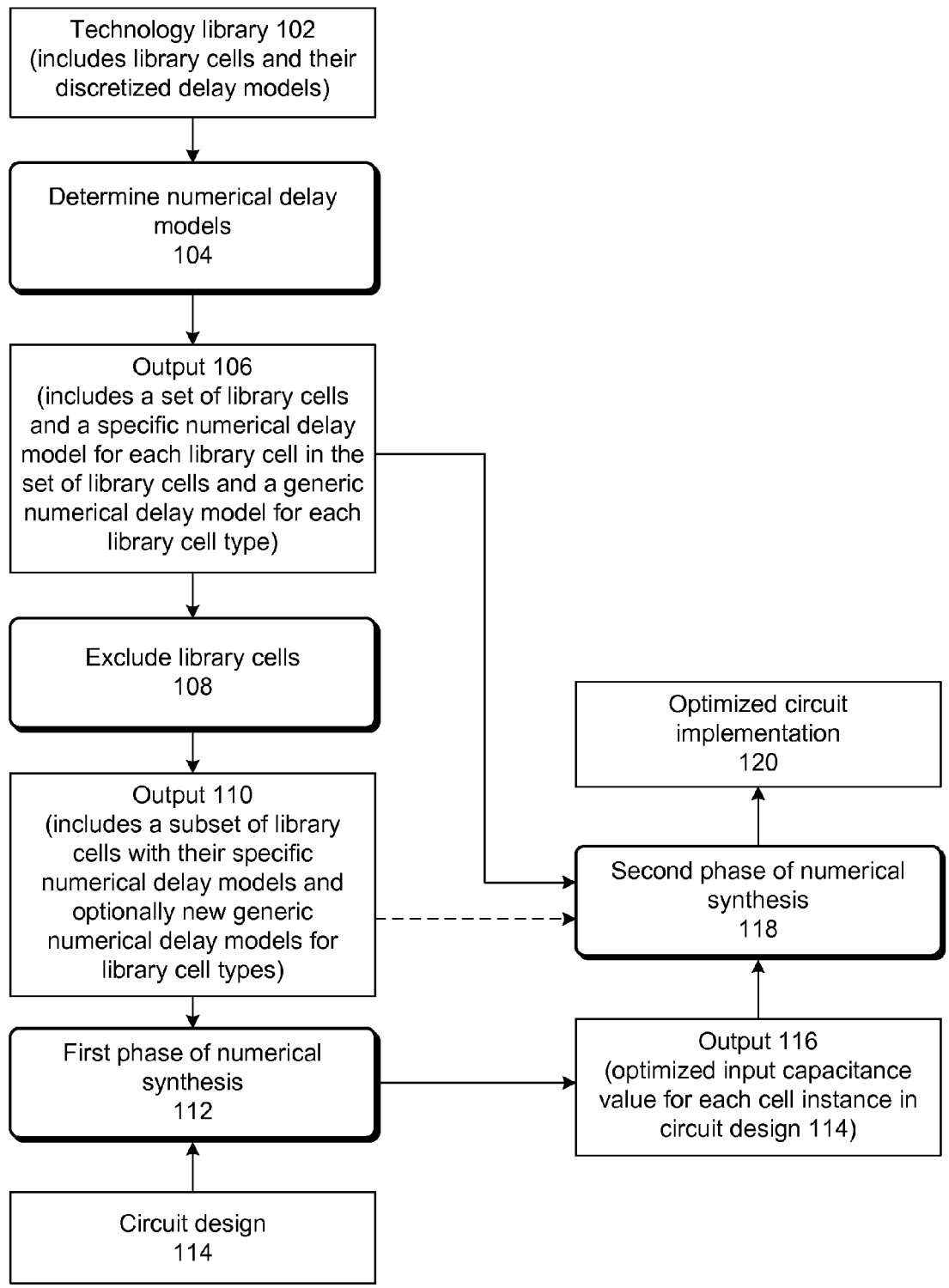
FIG. 1 illustrates a numerical synthesis process in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z.

Overview of an EDA Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality that they want to implement. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Numerical Synthesis

FIG. 1 illustrates a numerical synthesis process in accordance with some embodiments described herein.

Technology library 102 includes library cells and discretized non-linear delay models for the library cells. The library cells in the technology library 102 can be used to create and/or optimize a circuit design. The term "library cell" refers to a cell in a technology library. The term "library cell" is to be distinguished from the term "cell instance" which is an instantiation of a library cell in a circuit design. In some embodiments, a discretized delay model models the delay for a timing arc of a library cell. The terms "cell" and "gate" are used interchangeably in this disclosure.

The term "library cell type" refers to a particular logical functionality. Examples of functionalities include, but are not limited to, "AND," "OR," "XOR," "multiplexor," etc. The term "library cell" refers to a particular implementation of a library cell type. A technology library can be viewed as a collection of library cells of one or more library cell types. For example, a technology library may include multiple sizes of an inverter. In this example, the term "inverter" is the library cell type, and the term "library cell" refers to an inverter implementation of a particular size.

A numerical delay model is a delay model that can be used by a numerical solver to optimize a cost function. A linear delay model is one example of a numerical delay model. More generally, an analytical formula that represents the delay behavior is an example of a numerical delay model.

The term "specific numerical delay model" refers to a numerical delay model that models the delay behavior of a particular timing arc of a particular library cell, or the delay behavior of a particular library cell. A specific numerical delay model is defined using a specific logical effort value and a specific parasitic delay value.

The term "generic numerical delay model" refers to a numerical delay model that models an aggregated delay behavior of either a timing arc of a library cell type or the library cell type itself. A generic numerical delay model is defined using a generic logical effort value and a generic parasitic delay value.

Examples of systems and techniques that can be used to determine specific and generic numerical delay models (which can be used to perform operation 104) are described in U.S. patent application Ser. No. 13/450,178, entitled "Numerical delay model for a technology library cell and/or a technology library cell type," the contents of which are herein incorporated by reference in their entirety.

Some embodiments determine numerical delay models based on technology library 102 (operation 104). Output 106 of operation 104 can include a set of library cells and a specific numerical delay model for each library cell in the set of library cells and a generic numerical delay model for each library cell type. The set of library cells in output 106 typically includes all library cells in technology library 102, but in some embodiments certain library cells may be removed if desired.

Certain library cells can then be excluded (operation 108) to obtain a subset of library cells. Each library cell in the subset of library cells has a specific numerical delay model that was computed in operation 104. In some embodiments, a new generic numerical delay model can be determined for each cell type based on the specific numerical delay models corresponding to the subset of library cells. These generic numerical delay models are "new" because they are based on the subset of library cells as opposed to being based on the set of library cells that were used in operation 104 to determine the generic numerical delay models. Output 110, i.e., the subset of library cells with their specific numerical delay models and optionally the new generic numerical delay models for the library cell types, can then be provided as input to the first phase of numerical synthesis 112.

Examples of systems and techniques that can be used to exclude library cells (which can be used to perform operation 108) are described in U.S. patent application Ser. No. 13/479,807, entitled "Excluding library cells for delay optimization in numerical synthesis," the contents of which are herein incorporated by reference in their entirety.

The first phase of numerical synthesis 112 sizes cells in circuit design 114 using the subset of library cells with their specific numerical delay models and the new generic numerical delay models. In some embodiments, the first phase of numerical synthesis 112 models a numerical optimization problem based on circuit design 114 and the specific and generic numerical models for the subset of library cells. Output 116 from the first phase of numerical synthesis 112 includes the numerically optimized size for each cell instance in circuit design 114. Specifically, in some embodiments, output 116 includes the numerically optimized (and desired) input capacitance value for each cell instance in the circuit design 114.

Output 116 is then provided as one of the inputs to the second phase of numerical synthesis 118. The other inputs to second phase of numerical synthesis 118 include the library cells in technology library 102 and output 106 which includes the numerical delay models that were generated by operation 104. The second phase of the numerical synthesis 118 then instantiates cells that have the numerically optimized and desired cell sizes in circuit design 114 to produce optimized circuit implementation 120 using the discrete library cells from the technology library. In particular, for each cell instance in circuit design 114, the second phase of numerical synthesis 118 selects a library cell that best matches the numerically optimized size, (if a library cell with exactly the optimized size is not available, a library cell with nearly the optimized size is selected) from the set of library cells that were part of output 106. In some embodiments, second phase of numerical synthesis 118 also receives output 110 as input (shown in FIG. 1 using a dashed line). Specifically, second phase of numerical synthesis 118 uses the fact that certain cells were excluded from output 106 to determine which cells to instantiate. If the user marks certain library cells as "do not use" cells, then the optimization process does not use them.

The reason a subset of library cells is used in the first phase and the set of all library cells is used in the second phase is as follows. The first phase determines numerically optimized cell sizes by solving a numerical optimization problem. In this phase, it is desirable to restrict the search space to library cells that can be accurately modeled using a logical effort and parasitic delay based numerical modeling approach. More particularly, it is desirable to use a numerical model of library cells (e.g., a generic model) that best represents/fits the entire library cell type. To this end, it is desirable that the generic numerical model is not biased by some of the discrete library cells that do not fit the model (e.g., outliers can be ignored during model creation to remove the bias). For these reasons, a subset of library cells is used in this phase to restrict the search space. Once the numerically optimized cell sizes have been determined, it is important to enable the circuit synthesis process to select cell instances from a wide range of library cells. Therefore, in the second phase, the restriction on the search space is relaxed and the set of library cells that was in output 106 is used.

If multiple optimization iterations are being used, then the process can return to the first phase of numerical synthesis 112 and the optimized circuit implementation 120 can be provided as an input (e.g., as circuit design 114) to the next optimization iteration. The numerical delay models (e.g., outputs 106 and 110 in FIG. 1) can be generated once at the beginning of the flow, and then they can be reused during the multiple numerical optimizations in the numerical synthesis flow.

Numerical Synthesis Flow

Figure 2:
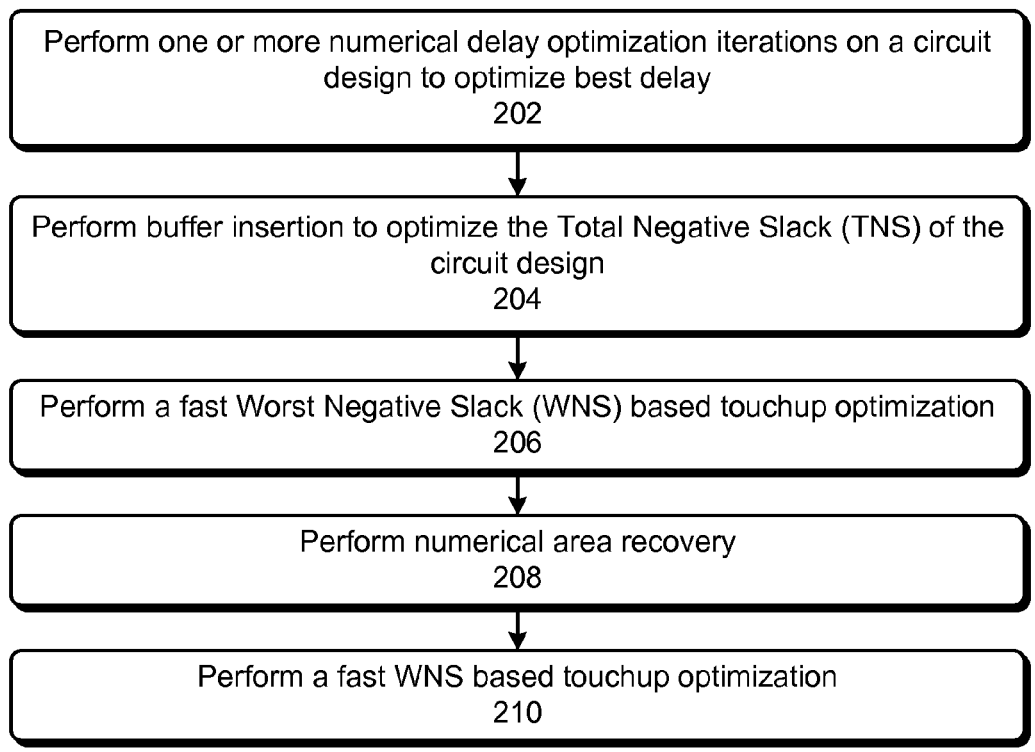
FIG. 2 illustrates a numerical synthesis flow in accordance with some embodiments described herein.

FIG. 2 illustrates a numerical synthesis flow in accordance with some embodiments described herein. The numerical synthesis flow can begin with performing one or more numerical delay optimization iterations on the circuit design to optimize best delay (operation 202). Note that, in each iteration (assuming multiple iterations of numerical delay optimization are performed in operation 202), the entire design is optimized using a numerical solver. Systems and techniques for optimizing a circuit design for best delay using a numerical solver are described in U.S. patent application Ser. No. 13/562,189, entitled "Determining optimal gate sizes by using a numerical solver," by inventors Mahesh A. Iyer and Amir H. Mottaez, which was filed on 30 Jul. 2012, and which is herein incorporated by reference in its entirety.

When a circuit design is optimized for best delay, the system minimizes the maximum delay (i.e., the worst delay) in critical regions. Although operation 202 may over-optimize many cells in the design because it doesn't consider desired delays (i.e., required delays), performing operation 202 is important to get a clear notion of criticality in the circuit design. The delay optimization itself uses the notion of criticality (based on the user-defined constraints) to decide which cells to work on during optimization. Once a cell is selected for optimization, a numerical circuit synthesis approach (e.g., the one described in U.S. patent application Ser. No. 13/562,189) is used to optimize the cell without considering the user constraints or the desired delays. Some embodiments also perform a discretization process that selects an actual cell from a cell library based on the optimal gate size that was outputted by the numerical optimizer. Note that the timing of the design is also updated after the discretization process.

Using this refined notion of criticality (i.e., the criticality in the optimized design after operation 202 is performed), some embodiments can perform a buffer insertion optimization that optimizes the Total Negative Slack (TNS) of the design (operation 204). The embodiments can use a trial-and-error TNS optimization approach that uses a numerical buffer candidate selection process (the numerical buffer candidate selection process uses current threshold voltage cells in its analysis). Since the numerical delay optimization (i.e., operation 202) optimizes the entire design, our experience is that the buffer insertion optimization operation (i.e., operation 204) has fewer nets to buffer (and therefore runs faster), and can also result in better quality of results (QoR) than in a flow that directly performs buffer insertion operation without performing the initial numerical delay optimization operation. Since the numerical delay optimization operation precedes the buffer insertion operation, the timing context in which buffer insertion is performed is significantly better, thereby improving the QoR.

The embodiments can then apply a Worst Negative Slack (WNS) based touchup optimization (operation 206). The WNS based touchup optimization can be based on trial-and-error approaches. Note that operation 206 is not a full-blown trial-and-error based optimization operation that operates on the entire design. Instead, operation 206 is performed to recover from errors that are sparse in the design. Our experience is that the computational effort for performing operation 206 is minimal, and substantially improves the QoR by correcting and recovering from errors that are inherent in the numerical model.

Recall that a numerical model tries to capture the overall behavior of a cell or a cell type. As such, the numerical model does not exactly model each and every cell in the cell library. Operation 206 uses the actual (non-linear delay model) NLDM tables of the actual cells that are instantiated in the design to compute delays, and therefore operation 206 can correct any errors that may have been introduced when the numerical models were created for the cell library.

At this point in the flow, most of the delay constraints have been addressed and the criticality of the circuit design is much more refined. Since we may have over-optimized several gates in the design, the embodiments can perform numerical area recovery on the circuit design (operation 208). Systems and techniques for performing numerical area recovery are described in U.S. patent application Ser. No. TBD, entitled "Numerical area recovery," by inventors Mahesh A. Iyer and Amir H. Mottaez, which was filed on 30 Jul. 2013, and which is herein incorporated by reference in its entirety. Note that the area recovery process also discretizes the optimized cells.

The embodiments can then perform a very fast WNS touchup optimization (operation 210). In general, circuit optimization can perform a number of optimization "tricks." However, in operation 210, the embodiments can restrict the optimization to only size the gates, thereby substantially speeding up the optimization. An important purpose of operation 210 is to quickly recover from any modeling errors in our numerical area recovery step that may have resulted in minor delay degradations.

Note that the flow illustrated in FIG. 2 does not address leakage power optimization. We now describe a numerical synthesis flow that is capable of robustly optimizing delay, area, and leakage power.

Improved Library Analysis

In some embodiments, technology library cells are organized by their threshold voltage groups either by the user or through automatic inference. That is, every class of technology library gates is organized on a per-threshold-voltage basis for purposes of library analysis. Without this classification, all library cells from all threshold voltage groups would be analyzed together to create the numerical models. However, with the threshold voltage group classification, each threshold group of cells can be analyzed separately to create specific and generic logical effort values and parasitic delays values for that threshold group (e.g., using the systems and techniques that were described in reference to operations 104 and 108 in FIG. 1). This per-threshold voltage organization of the specific and generic logical effort values and parasitic delay values enables leakage power optimization within a numerical physical synthesis flow.

Numerical Synthesis Flow for Optimizing Delay, Area, and Leakage Power

In some embodiments, the following two features enable the embodiments to optimize leakage power during the numerical physical synthesis flow: (1) minimize the amount of lower threshold voltage cells that are used during delay optimization, and (2) minimize leakage power using a powerful numerical formulation that optimizes area and leakage power simultaneously.

Figure 3A:
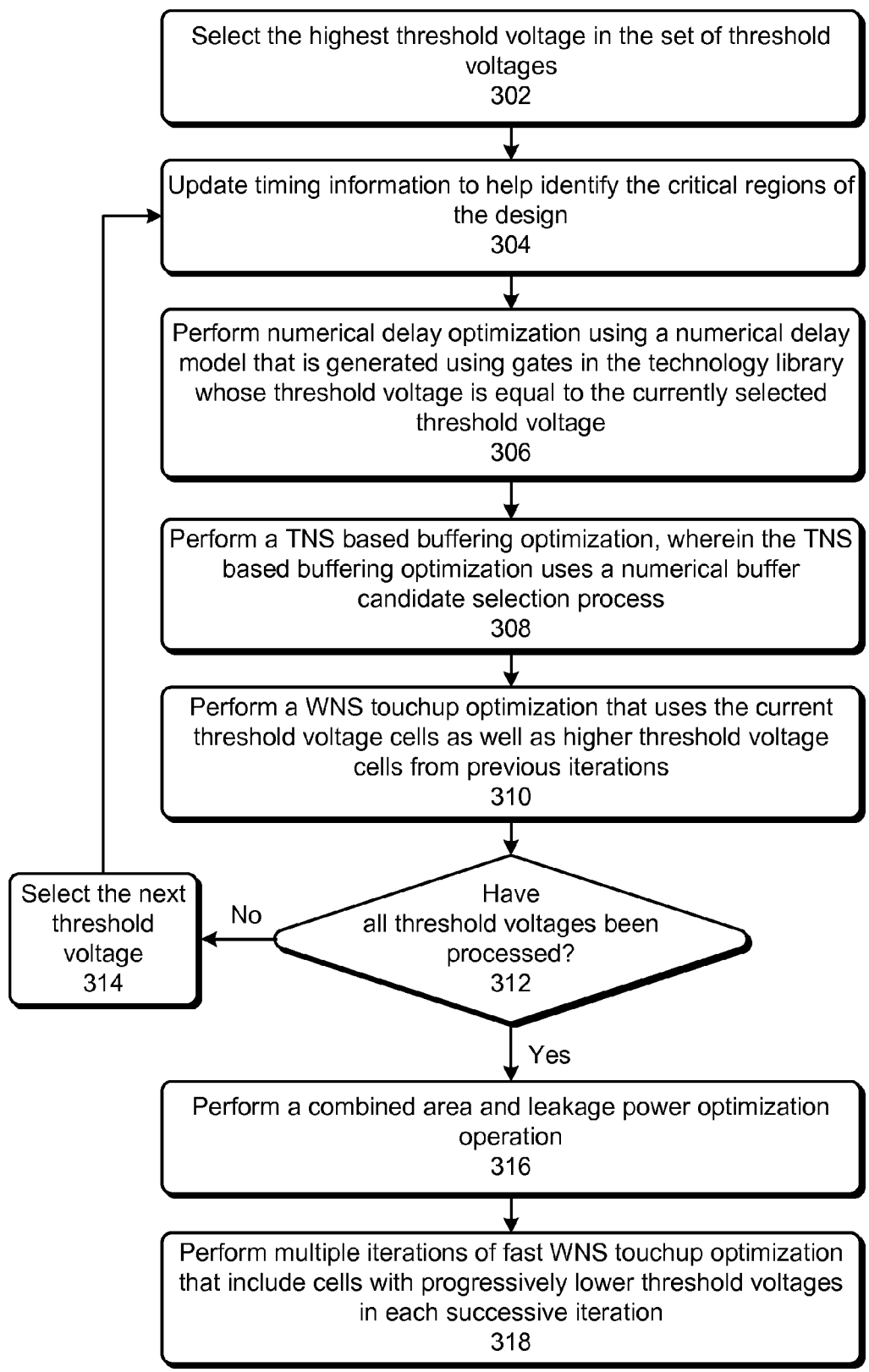
FIG. 3A illustrates a numerical synthesis flow in accordance with some embodiments described herein.

FIG. 3A illustrates a numerical synthesis flow in accordance with some embodiments described herein. In FIG. 3A, numerical synthesis is performed for each threshold voltage separately, starting with the highest threshold voltage cells, and progressively using lower threshold voltage cells in successive iterations. For example, suppose there are three threshold voltage levels (in general there can be an arbitrarily number of threshold voltage levels): high threshold voltage (HVt), standard threshold voltage (SVt), and low threshold voltage (LVt). Then, the order in which the threshold voltage cells are processed is: HVt, SVt, LVt.

Recall that library analysis determines the specific and generic logical efforts and parasitic delays for each threshold voltage separately. Additionally, as explained below, numerical delay optimization only works on the parts of the design that are critical in the current iteration. The delay-driven discretization step is also performed using the current threshold voltage group of cells.

The process can begin with selecting the highest threshold voltage in the set of threshold voltages (operation 302). Next, the embodiments can update timing information to help identify the critical regions of the design (operation 304). Numerical delay optimization can then be performed using a numerical delay model that is generated using gates in the technology library whose threshold voltage is equal to the currently selected threshold voltage (operation 306), wherein the numerical delay optimization optimizes best delay. In some embodiments, operation 306 can involve multiple iterations of numerical delay optimization. After performing each iteration of numerical delay optimization, a discretization operation can be performed in which the optimal gate size is used to select an actual gate for instantiation.

Next, the embodiments can perform a TNS based buffering optimization, wherein the TNS based buffering optimization uses a numerical buffer candidate selection process (operation 308). This operation can use the current threshold voltage cells as well as higher threshold voltage cells from previous iterations. For example, if the current threshold voltage is {SVt}, then operation 308 can use HVt cells and SVt cells during optimization. The reason for allowing higher threshold voltage cells from previous iterations to be used in operation 308 is that a trial-and-error TNS buffering approach performs delay optimization that best satisfies the constraints with minimal area and leakage as a secondary cost. Note that the trial-and-error TNS buffering approach uses a numerical buffer candidate selection process that uses the current threshold voltage cells in its analysis.

The embodiments can then perform a WNS touchup optimization that uses the current threshold voltage cells as well as higher threshold voltage cells from previous iterations (operation 310). For example, if the current threshold voltage is {SVt}, then operation 310 can use HVt cells and SVt cells during optimization. The reason for allowing higher threshold voltage cells from previous iterations to be used in operation 310 is that a trial-and-error WNS optimization performs delay optimization that best satisfies the constraints with minimal area and leakage as a secondary cost.

Once all threshold voltage groups have been used for delay optimization, the process can then perform a combined area and leakage optimization operation. Specifically, the process can check if any more threshold voltages need to be processed in the set of threshold voltages (operation 312). If more threshold voltages are to be processed, then the next threshold voltage is selected (operation 314), and the process can return to operation 304. In operation 314, the highest threshold voltage in the remaining set of threshold voltages may be selected.

Otherwise, if no more threshold voltages are to be processed, then the process can perform a combined area and leakage power optimization operation (operation 316) that is described below in further detail in reference to FIG. 3B. After operation 316, the process can perform multiple iterations of fast WNS touchup optimization that include cells with progressively lower threshold voltages in each successive iteration (operation 318).

For example, suppose there are three threshold voltages: HVt, SVt, and LVt. Then, in the first iteration, the process can perform fast WNS by using only HVt cells. In the second iteration, the process can perform fast WNS by using both HVt and SVt cells, and in the third iteration, the process can perform fast WNS by using HVt, SVt, and LVt cells. The reason for mixing threshold voltages in operation 318 is that the fast WNS technique (which can be a trial-and-error based technique) is capable of performing a discrete sizing optimization that determines the optimum trade-off between the different threshold voltage cells that are exposed in that phase of the optimization. As mentioned above, an important motivation for performing the fast WNS operation is to recover from any minor WNS degradations during the composite numerical area and leakage optimization operation that may have been caused due to the inherent errors present in the numerical model.

Figure 3B:
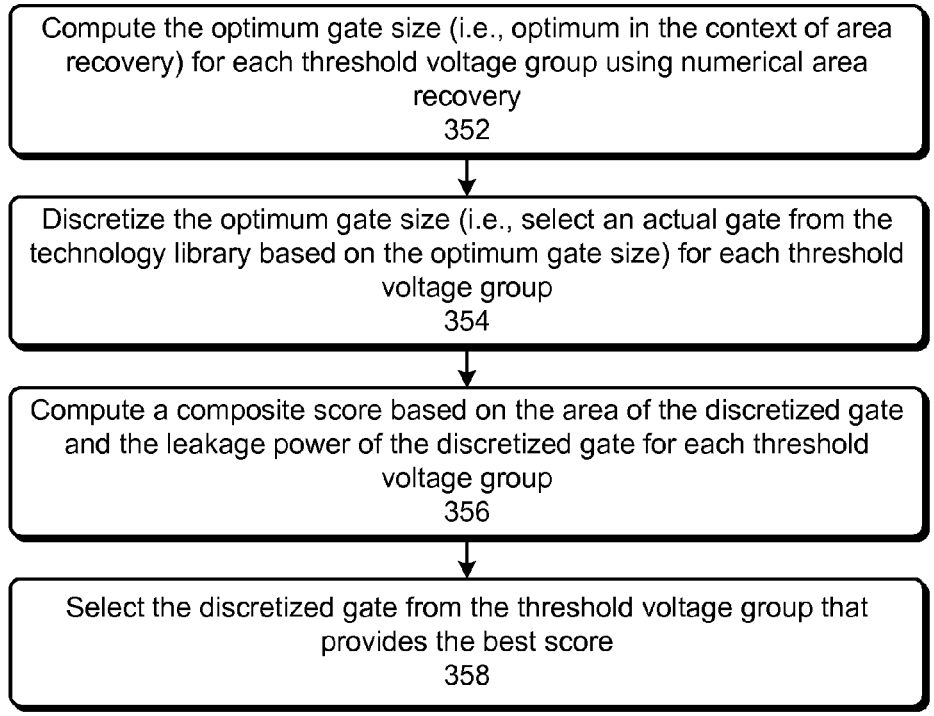
FIG. 3B illustrates a process for performing combined area and leakage optimization in accordance with some embodiments described herein.

FIG. 3B illustrates a process for performing combined area and leakage optimization in accordance with some embodiments described herein. The process illustrated in FIG. 3B can be performed during operation 316 illustrated in FIG. 3A. The process can begin by computing the optimum gate size (i.e., optimum in the context of area recovery) for each threshold voltage group using numerical area recovery (operation 352). Next, the optimum gate size for each threshold voltage group is discretized (operation 354), i.e., an actual gate is selected from a technology library for each threshold voltage based on the optimum gate size for each threshold voltage. The process can then compute a composite score for the discretized gate in each threshold voltage group, wherein the composite score is computed based on the area of the gate and the leakage power of the gate (operation 356). For example, in one embodiment, the score can be computed as a weighted sum of the normalized area and leakage power values for a gate, i.e., the score can be equal to (w1×area+w2×leakage_power), wherein w1 and w2 are positive non-zero values. Alternatively, the score can be a product of the normalized area and leakage power, i.e., the score can be equal to (area× leakage_power). The area and leakage power values can be normalized based on the technology library (e.g., the area or leakage power of a given cell can be divided by the total range of area or leakage powers in the technology library). The process can then select the discretized gate from the threshold voltage group that provides the best score (operation 358), i.e., the discretized gate with the minimum score can be selected.

Note that the process illustrated in FIG. 3B optimizes a composite cost function of area and leakage power, and selects the best solution across all threshold voltage groups. Furthermore, note that the process does not mix between threshold voltage groups and each group is analyzed separately (i.e., operations 352 and 354 are performed on each threshold voltage group separately).

Computer System

Figure 4:
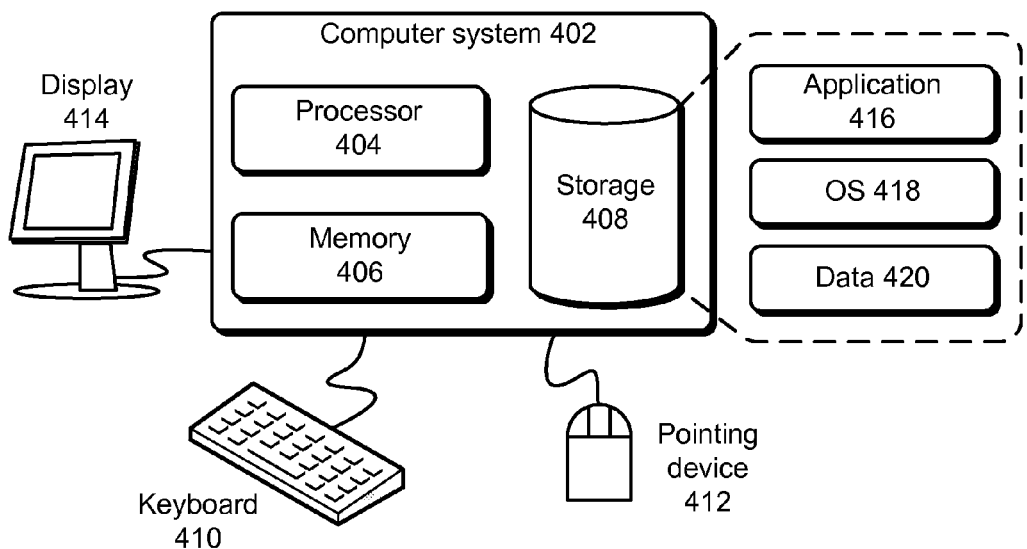
FIG. 4 illustrates a computer system in accordance with some embodiments described herein.

FIG. 4 illustrates a computer system in accordance with some embodiments described herein. A computer system can generally be any system that can perform computations. Specifically, a computer system can be a microprocessor, an application specific integrated circuit, a distributed computing system, a cloud computing system, or any other computing system now known or later developed. Computer system 402 comprises processor 404, memory 406, and storage 408. Computer system 402 can be coupled with display 414, keyboard 410, and pointing device 412. Storage 408 can generally be any device that can store data. Specifically, a storage device can be a magnetic, an optical, or a magneto-optical storage device, or it can be based on flash memory and/or battery-backed up memory. Storage 408 can store application 416, operating system 418, and data 420.

Application 416 can include instructions that when executed by computer 402 cause computer 402 to perform one or more processes that are implicitly or explicitly described in this disclosure. Data 420 can include any data that is inputted into or outputted by application 416.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing delay, area, and leakage power optimization on a circuit design, the method comprising:
iteratively performing, by computer, at least the following set of operations in a loop, wherein in each iteration a current threshold voltage value is progressively decreased:
performing numerical delay optimization on the circuit design using a numerical delay model that is generated using gates whose threshold voltages are equal to the current threshold voltage, and
performing a worst negative slack touchup optimization on the circuit design, wherein the worst negative slack touchup optimization uses gates whose threshold voltages are greater than or equal to the current threshold voltage; and performing combined area and leakage power optimization on the circuit design.

2. The method of claim 1, wherein the set of operations in the loop further comprises performing a total negative slack based buffering optimization on the circuit design, wherein the total negative slack based buffering optimization uses a numerical buffer candidate selection process that uses current threshold voltage cells.

3. The method of claim 1, wherein the set of operations in the loop further comprises updating timing information to help identify critical regions in the circuit design.

4. The method of claim 1, wherein performing the combined area and leakage power optimization includes:
computing an optimal gate size for each threshold voltage group using numerical area recovery;
discretizing the optimal gate size for each threshold voltage group to obtain a discretized gate for each threshold voltage group;
computing a composite score based on an area and a leakage power of the discretized gate for each threshold voltage group; and
selecting the discretized gate from the threshold voltage group that has the best composite score.

5. The method of claim 1, further comprising performing multiple iterations of worst negative slack touchup optimization, wherein cells with progressively lower threshold voltages are used in each successive iteration.

6. A non-transitory computer-readable storage medium storing instructions that, when executed by a computer, cause the computer to perform a method for performing delay, area, and leakage power optimization on a circuit design, the method comprising:
iteratively performing at least the following set of operations in a loop, wherein in each iteration a current threshold voltage value is progressively decreased:
performing numerical delay optimization on the circuit design using a numerical delay model that is generated using gates whose threshold voltages are equal to the current threshold voltage, and
performing a worst negative slack touchup optimization on the circuit design, wherein the worst negative slack touchup optimization uses gates whose threshold voltages are greater than or equal to the current threshold voltage; and performing combined area and leakage power optimization on the circuit design.

7. The non-transitory computer-readable storage medium of claim 6, wherein the set of operations in the loop further comprises performing a total negative slack based buffering optimization on the circuit design, wherein the total negative slack based buffering optimization uses a numerical buffer candidate selection process that uses current threshold voltage cells.

8. The non-transitory computer-readable storage medium of claim 6, wherein the set of operations in the loop further comprises updating timing information to help identify critical regions in the circuit design.

9. The non-transitory computer-readable storage medium of claim 6, wherein performing the combined area and leakage power optimization includes:
computing an optimal gate size for each threshold voltage group using numerical area recovery;
discretizing the optimal gate size for each threshold voltage group to obtain a discretized gate for each threshold voltage group;
computing a composite score based on an area and a leakage power of the discretized gate for each threshold voltage group; and
selecting the discretized gate from the threshold voltage group that has the best composite score.

10. The non-transitory computer-readable storage medium of claim 6, further comprising performing multiple iterations of worst negative slack touchup optimization, wherein cells with progressively lower threshold voltages are used in each successive iteration.

11. An apparatus, comprising:
a processor; and
a non-transitory computer-readable storage medium storing instructions that, when executed by the processor, cause the apparatus to perform a method for performing delay, area, and leakage power optimization on a circuit design, the method comprising:
iteratively performing at least the following set of operations in a loop, wherein in each iteration a current threshold voltage value is progressively decreased:
performing numerical delay optimization on the circuit design using a numerical delay model that is generated using gates whose threshold voltages are equal to the current threshold voltage, and
performing a worst negative slack touchup optimization on the circuit design, wherein the worst negative slack touchup optimization uses gates whose threshold voltages are greater than or equal to the current threshold voltage; and performing combined area and leakage power optimization on the circuit design.

12. The apparatus of claim 11, wherein the set of operations in the loop further comprises performing a total negative slack based buffering optimization on the circuit design.

13. The apparatus of claim 11, wherein the set of operations in the loop further comprises updating timing information to help identify critical regions in the circuit design.

14. The apparatus of claim 11, wherein performing the combined area and leakage power optimization includes:
computing an optimal gate size for each threshold voltage group using numerical area recovery;
discretizing the optimal gate size for each threshold voltage group to obtain a discretized gate for each threshold voltage group;
computing a composite score based on an area and a leakage power of the discretized gate for each threshold voltage group; and selecting the discretized gate from the threshold voltage group that has the best composite score.

15. The apparatus of claim 11, wherein the method further comprises performing multiple iterations of worst negative slack touchup optimization, wherein cells with progressively lower threshold voltages are used in each successive iteration.

* * * * *